United States Patent
Yu et al.

(10) Patent No.: US 12,375,385 B2
(45) Date of Patent: Jul. 29, 2025

(54) NETWORK EMULATION SYSTEM SUPPORTING FLEXIBLE AND EFFICIENT DYNAMIC EXPERIMENT

(71) Applicant: University of Electronic Science and Technology of China, Chengdu (CN)

(72) Inventors: Hongfang Yu, Chengdu (CN); Gang Sun, Chengdu (CN); Tie Ma, Chengdu (CN); Chongxi Ma, Chengdu (CN); Yunhan Xie, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 365 days.

(21) Appl. No.: 17/988,777

(22) Filed: Nov. 17, 2022

(65) Prior Publication Data
US 2023/0327973 A1    Oct. 12, 2023

(30) Foreign Application Priority Data
Apr. 11, 2022   (CN) .......................... 202210375290.2

(51) Int. Cl.
*G06F 15/173*    (2006.01)
*H04L 41/14*     (2022.01)
*H04L 43/55*     (2022.01)

(52) U.S. Cl.
CPC ............ *H04L 43/55* (2022.05); *H04L 41/145* (2013.01)

(58) Field of Classification Search
CPC .............................. H04L 43/55; H04L 41/145
See application file for complete search history.

(56) References Cited

U.S. PATENT DOCUMENTS

| | | | | |
|---|---|---|---|---|
| 7,844,432 B1* | 11/2010 | Jones | ...................... | H04L 43/50 703/13 |
| 9,600,386 B1* | 3/2017 | Thai | .................... | H04L 12/4641 |
| 2018/0337830 A1* | 11/2018 | Padhye | ................. | H04L 41/122 |
| 2019/0362093 A1* | 11/2019 | Horst | .................. | G06F 21/6254 |
| 2020/0326961 A1* | 10/2020 | Lawrence | .............. | G06N 5/022 |

* cited by examiner

*Primary Examiner* — Duyen M Doan
(74) *Attorney, Agent, or Firm* — Bayramoglu Law Offices LLC

(57) ABSTRACT

A network emulation system supporting a flexible and efficient dynamic experiment emulates a network based on container, veth-pair, traffic control (TC), and other technologies and sets a network state management model based on a key-value pair, thereby constructing a network emulation system supporting a flexible and efficient dynamic experiment. The system flexibly realizes the dynamic performance of a plurality of dimensions, namely, dynamic node start/stop, dynamic node attribute configuration, dynamic link start/stop, and dynamic link attribute configuration. Based on the network state management model, the network emulation system provides a concise and unified dynamic application programming interface (API) for an upper layer. Researchers can call the API in their network innovation programs at any time after an emulation network is deployed to achieve efficient, batch-processing, and programmable dynamic management. The network emulation system greatly facilitates the experimental work of the researchers in a dynamic scenario of the network.

12 Claims, 2 Drawing Sheets

NETWORK EMULATION SYSTEM SUPPORTING FLEXIBLE AND EFFICIENT DYNAMIC EXPERIMENT

CROSS REFERENCE TO THE RELATED APPLICATIONS

This application is based upon and claims priority to Chinese Patent Application No. 202210375290.2, filed on Apr. 11, 2022, the entire contents of which are incorporated herein by reference.

TECHNICAL FIELD

The present disclosure relates to the technical field of network communication, and specifically, to a network emulation system supporting a flexible and efficient dynamic experiment.

BACKGROUND

At present, the development of information technologies represented by 5G communication, the Internet of Things (IoT), and edge computing has posed new challenges to the carrying capacity, transmission speed, and overall architecture of a network. To meet rapidly increasing network demands, colleges and universities, enterprises, and research institutions have invested a large amount of labor in the innovative development and research of network technologies. In a process of researching a network technology, researchers often need to test its algorithm or architecture in advance by using a network experimental platform to verify and optimize performance and avoid a possible economic loss caused by the direct deployment of the network technology in a production environment.

Nowadays, there are mainly three types of network experimental platforms: a test bed, an emulation platform, and a simulation platform. The test bed is deployed in a real environment, and real equipment is used. The test bed can achieve a good experimental effect in some scenarios and has a certain degree of fidelity. However, the test bed has the defects of being costly, difficult to adjust in a network environment, and the like. The simulation platform usually uses a discrete event or a mathematical model to model the network environment, which is flexible in adjustment and small in overheads. However, because no real network environment is available, the experimental result obtained has no fidelity. In addition, the experimental program is not portable and cannot be directly deployed in the real environment. In contrast to the test bed and the simulation platform, the emulation platform uses software to emulate the real network environment. Characterized by lightweight and small overheads, the emulation platform has a real network protocol stack and good experimental fidelity. Additionally, the implementation of code used by the emulation platform to conduct an experiment can be easily migrated to the production environment. Therefore, in recent years, the emulation platform is increasingly appreciated by researchers.

When using a network emulation platform to conduct a network experiment, researchers often have a demand for dynamic emulation. For example, in the research of a wireless network, the bandwidth, delay, and packet loss rate of a millimeter wave channel are characterized by large fluctuations, which poses a new challenge to a dynamic change of a link attribute. In some traffic scheduling algorithms, it is necessary to consider the impact of the start or malfunction of some nodes on their scheduling strategies. In the research of a load balancing algorithm of a data center network, researchers attach great importance to the impact of the addition or malfunction of some links on the robustness of the load balancing algorithm. In addition, for some experiments based on large-scale network topology, it often takes a long time to deploy the topology. If the network topology is redeployed each time an experiment is conducted, a huge time overhead is caused, which hinders network innovation. This requires the network emulation platform to dynamically modify configurations on the deployed topology in batches, making it convenient to quickly change parameters for innovation verification. In addition, to facilitate the automation of experiments and the rapid implementation of relevant ideas, these dynamic changes need to be made in batches and a programmable manner.

As a mainstream network emulation platform, Mininet provides host emulation by using Linux's namespace technology, Open vSwitch as a software switch, and a veth-pair as a virtual link. Mininet allows defining and creating a topology in the form of a python script. After running a topology creation script, Mininet establishes an emulation network on a host and stores state information of the emulation network in the memory of a Mininet process as a variable in a python programming language. After the emulation network is established, Mininet does not immediately terminate the topology creation script but enables a command line interface (mininet-cli) on the process of the topology creation script for researchers to control the emulation network. There are two approaches to realizing dynamic performance in Mininet. In the first approach, a dynamic event is predefined in the topology creation script. In the second approach, after the topology is successfully created, a command is executed in a command line interaction program on a process of Mininet.

However, the dynamic performance of Mininet has its limitations. In the first approach, although researchers can realize the dynamic performance in batches and in a programmable manner, this is just a type of predefined pseudo-dynamic performance, which cannot change a node, a link, and their attributes in real-time, and cannot flexibly support a dynamic experiment. In the second approach, although researchers can achieve the dynamic performance in real-time through mininet-cli, due to the isolation of the process, other experimental programs of the researchers cannot access the state information of the emulation network from the memory of Mininet. As a result, the researchers cannot control the emulation network in batches and a programmable manner. This inefficiency brings inconvenience to network experiments. In addition, Mininet does not natively provide a router, a firewall, and other nodes, which makes it unable to simulate dynamic start/stop and dynamic attribute configuration of the router, firewall, and other nodes.

Kollaps is a network emulation platform proposed at the EuroSys 2020 Conference for the area of computer systems architecture. Kollaps uses a container to emulate a peer node and uses a topological folding technology to aggregate a plurality of end-to-end links and their attributes into one link. Due to a large overhead of link aggregation of Kollaps, when an attribute of a single link changes, it takes a long time to realize link re-aggregation, which is unacceptable in the experiment. Finally, Kollaps adopts the manner of pre-defining the dynamic script. Researchers predefine a plurality of dynamic events and their occurrence time points in the predefined script, such as node start/stop, link start/stop, link attribute change, and the like. Kollaps calculates a to-beaggregated link in advance based on the dynamic events defined by the researchers in advance to realize the dynamic performance. After the topology is successfully deployed, Kollaps executes these dynamic events in turn based on the defined occurrence time points of these events.

Although Kollaps can achieve a more comprehensive dynamic performance, this dynamic performance is also a predefined pseudo-dynamic performance. When researchers use Kollaps to complete a dynamic experiment, if they want to fine-tune some parameters and then re-conduct the experiment, they have to perform link aggregation, topology deployment, and other processes again, which is time-consuming, reduces the efficiency of the network experiment, and greatly hinders network innovation. Even in the case of a large topology, such a time overhead will be unacceptable. In addition, Kollaps lacks flexibility and can only emulate an attribute of the end-to-end link but cannot emulate dynamic changes of a single link and switching nodes such as a router, a switch, and the like.

SUMMARY

The present disclosure provides a network emulation system supporting a flexible and efficient dynamic experiment to improve the flexibility and dynamic performance of dynamic node and link emulation.

The present disclosure adopts the following technical solution.

A network emulation system supporting a flexible and efficient dynamic experiment includes an underlying emulation network and a network state management model.

The underlying emulation network is configured to emulate a node and a link between nodes, emulate different types of nodes by using container technology, and establish an emulation link between two emulation nodes by using a veth-pair technology. An emulation network interface card capable of being started or stopped at any time is separately created on the two emulation nodes. The emulation link is established between the two emulation network interface cards. The underlying emulation network is also configured to emulate a link attribute by using the traffic control (TC) technology of a Linux operating system and to support the dynamic configuration of an emulation link attribute.

The network state management model is configured to describe the node, the link, and their connection relationships emulated by the underlying emulation network, periodically perform state synchronization with the underlying emulation network, and provide a user with a dynamic application programming interface (API).

The network state management model describes node state information and link state management information in the form of a key-value pair.

In the node state information, one node is uniquely located based on a combination of a project name and a node name, where the recorded node state information includes but is not limited to:

a container identifier (ID) of the node, which is used to locate the node when the dynamic API is executed;

image, node type, and node subtype information of the node, which is used by the user to perform batch dynamic operations on the node through classification;

node attribute information, which is used by the user to dynamically configure a node attribute; and network interface card information of the node, which is used to provide the user with basic network address information.

The link state management information is used to uniquely locate one link based on a combination of the project name and a link name and describe related information and a connection relationship of the link, where the described information includes but is not limited to:

source and destination nodes of the link;

network interface card information of the source and destination nodes of the link, which is used to provide the user with connection relationship information of the nodes; and link attribute information, which is used by the user to dynamically configure the link attribute based on the link attribute information by using the API.

Further, a synchronization mechanism between the underlying emulation network and the network state management model is:

collecting, by using a configured application program for state monitoring, a state of the underlying emulation network in real-time, including a node operation state, a real-time node attribute, a link operation state, and a real-time link attribute; and when state information of the underlying emulation network is detected to be inconsistent with that of the network state management model, updating the state information of the network state management model in real-time, namely, updating the node state information and the link state management information of the network state management model.

Further, the network emulation system includes a plurality of preconfigured dynamic APIs, which are selected and called by the user to perform dynamic start/stop and dynamic configuration on the node and the link, where the dynamic APIs are described in the form of a dynamic API list, including an API name and a function description.

Further, the node attribute information includes but is not limited to configuration information and a gateway of the node.

Further, the network interface card information of the node includes but is not limited to a name, a type, a network interface card name, and an Internet Protocol (IP) address of the node.

Further, the link attribute information includes but is not limited to bandwidths, delays, and packet loss rates of network interface cards of the source and destination nodes.

Further, the network state management model is preferably implemented based on a Redis database.

The technical solutions provided by the present disclosure have the following beneficial effects.

(1) A flexible dynamic node and link emulation scheme is provided to emulate a network node and link by using a container, veth-pair, TC, and other technologies, such that an emulation node and link can be changed dynamically and flexibly.

(2) A state management model that can support efficient, batch-processing, and programmable dynamic management is provided to perform refined modeling on a node, a link, and their connection relationships of an underlying emulation network. A synchronization mechanism between the model and the emulation network is set, and a concise and easy-to-use dynamic API is provided based on the state management model. This helps researchers to efficiently manage the dynamic performance of the underlying emulation network in a programmable manner and promotes a process of network innovation.

BRIEF DESCRIPTION OF THE DRAWINGS

To describe the technical solutions in the embodiments of the present disclosure more clearly, the accompanying drawings required for describing the embodiments are briefly described below. The accompanying drawings in the following description show merely some embodiments of the present disclosure, and those of ordinary skill in the art may still derive other drawings from these drawings without creative efforts.

DETAILED DESCRIPTION OF THE EMBODIMENTS

Figure 1:
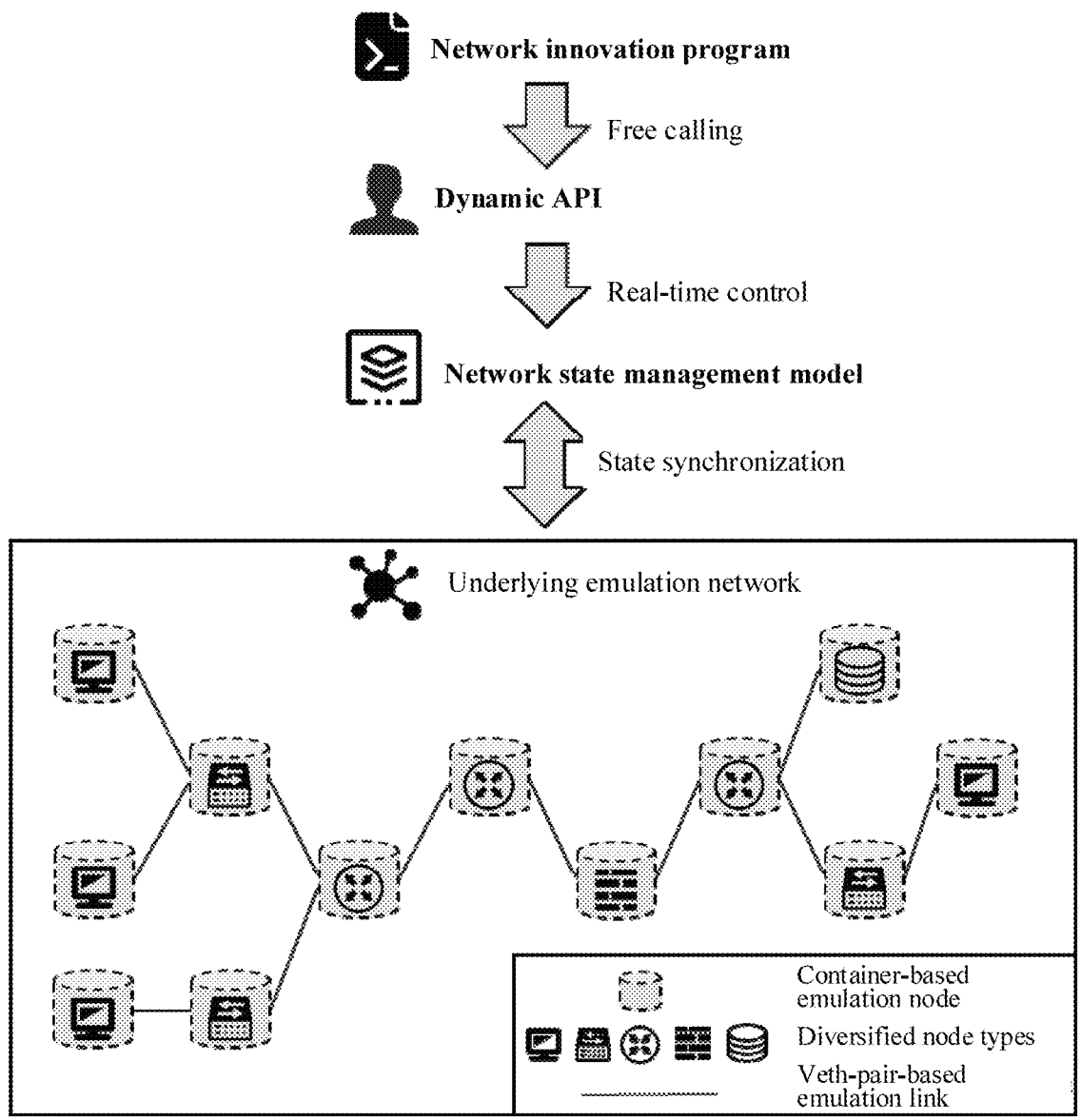
FIG. 1 is a diagram of an overall architecture of a network emulation system supporting a flexible and efficient dynamic experiment according to an embodiment of the present disclosure.

To make the objectives, technical solutions, and advantages of the present disclosure clear, implementations of the present disclosure will be further described in detail below with reference to the accompanying drawings.

Current network emulation platforms cannot meet or can only partially meet the demands of researchers for conducting dynamic network experiments. There are two challenges in conducting a dynamic emulation experiment flexibly and efficiently:

(1) How to emulate a node and a link to make them have flexible dynamic performance. The flexible dynamic performance of the node and the link is the ability of the node and the link to change flexibly and dynamically, such as dynamic node start/stop, dynamic node attribute configuration, dynamic link start/stop, and dynamic link attribute configuration. To make the node and the link have flexible dynamic performance, emulation schemes of the node and the link need to consider the following two factors: Firstly, an emulation node and an emulation link need to have interactivity as well as attributes approximate to those of the real device to perform dynamic start/stop and dynamic attribute configuration. Secondly, the emulation of a whole network cannot be replaced by the emulation of an end-to-end attribute of the network. All elements (including a host node, a switching node, an intermediate link, and the like) in the whole network and their attributes need to be emulated truthfully, such that a network innovation experiment can realize dynamic changes of any node and link.

(2) How to establish a management model for states of a node and a link that have dynamic performance, such that the management model can support efficient, batch-processing, and programmable dynamic management. The efficient, batch-processing, and programmable dynamic management is to control the dynamic performance of the node and the link in batches through programming to conduct the dynamic experiment efficiently and automatically. To support efficient, batch-processing, and programmable dynamic management, it is necessary to establish the management model for the states of the node and the link. The model needs to consider the following factors: Firstly, the model needs to record the node, the link, and their connection relationships in detail, such that researchers can fully obtain topology-related information. Secondly, an access right of the model should not be limited to the emulation platform but should be open to any experimental program outside the platform, such that the researchers can control the management model by using a compiled experimental program and then perform batch control on the dynamic performance of an emulation network described by the model.

The embodiments of the present disclosure emulate a network based on container, veth-pair, TC, and other technologies and set a network state management model based on a key-value pair, thereby constructing a network emulation system supporting a flexible and efficient dynamic experiment. The system flexibly realizes the dynamic performance of a plurality of dimensions, namely, dynamic node start/stop, dynamic node attribute configuration, dynamic link start/stop, and dynamic link attribute configuration. Based on the network state management model, the present disclosure provides a concise and unified dynamic API for an upper layer. The researchers can call the API in their network innovation programs at any time after the emulation network is deployed to achieve efficient, batch-processing, and programmable dynamic management. The present disclosure greatly facilitates the experimental work of the researchers in a dynamic scenario of the network and injects new power into network innovation.

As shown in FIG. 1, a network emulation system supporting a flexible and efficient dynamic experiment according to an embodiment of the present disclosure mainly includes two parts: an underlying emulation network and a network state management model. The underlying emulation network is an actual bearer of an experimental network of a user. The underlying emulation network includes various types of nodes (such as an end host, a switch, a router, a firewall, and a database), and provides an all-around flexible emulation of host and switching nodes. The underlying emulation network can also provide various types of links (such as a fixed-attribute link, a millimeter wave link, and a satellite link) based on actual needs. The network state management model describes a node, a link, and their connection relationships in detail. The network state management model periodically performs state synchronization with the underlying emulation network and provides a dynamic API for an upper layer, such that the user can freely and efficiently control the dynamic performance of the network in a network innovation program (to-be-verified algorithm program, namely, a program set by the user for a network related algorithm).

To enable an emulation node and an emulation link to have the ability to change dynamically, emulation schemes used by the node and the link should be carefully considered. For example, to realize the dynamic start/stop of any type of node, emulation nodes of various types need to be provided. To realize dynamic node attribute configuration, the emulation node needs to have an attribute approximate to that of a real device. To realize the dynamic start/stop of any link, the emulation link needs to correspond to all links of an actual topology. To realize dynamic link attribute configuration, the emulation link needs to have an attribute approximate to that of a real link.

In this embodiment of the present disclosure, container technology is used to emulate the node. As a lightweight virtualization technology of the Linux kernel, a container shares an operating system kernel and is implemented based on Namespace and Cgroup technologies of an operating system to provide network isolation, file system isolation, and the like. In addition, compared with virtual machine technology, the container is characterized by fast start/stop and small overhead, and therefore, can be flexibly deployed. The container can be generated by an image. There are image repositories represented by a docker hub on the Internet, which provide a large number of images. Custom images can also be created manually, which greatly enriches container types. The container is used as a network node of the emulation network, which can enable each network node to have an independent network and file space, and allows independent configuration and independent software installation. In this way, the network node of the emulation network has isolation and configurability approximate to those of a real physical device. The container is lightweight, which enables the network node to quickly perform dynamic start/stop and makes it easy to expand a network scale. The rich image repositories enrich network node types to simulate a plurality of network nodes including the host node and the switching node.

In this embodiment of the present disclosure, the emulation link is established between two emulation network nodes by using a veth-pair technology. As a virtual cable provided by the Linux operating system, a veth-pair is implemented by a two-way pipe and is often used to connect two different network namespaces. In this embodiment of the present disclosure, the veth-pair separately creates an emulation network interface card that can be started or stopped at any time on the two emulation network nodes and establishes the emulation link between the two emulation network interface cards. When the network interface card at any end of the emulation link stops, the emulation link is disconnected. Therefore, this embodiment of the present disclosure can emulate dynamic link start/stop.

After the emulation link is successfully established, a link attribute needs to be added for the emulation link. The present disclosure emulates the link attribute by using a TC technology of the Linux operating system. The TC technology can modify, by configuring a queue rule, a packet scheduling policy used by the Linux operating system to send a packet. The TC technology contains a quality of queue rules, including a token bucket queue, a fair queue, a first in first out (FIFO) queue, a multi-priority queue, and the like, which can be used to emulate link attributes such as bandwidth, delay, and packet loss rate of the emulation link, and various queue types. The TC technology also supports a real-time change to the queue rule. With these characteristics of the TC technology, this embodiment of the present disclosure can provide rich emulation link attributes and support the dynamic configuration of the emulation link attributes.

In this embodiment of the present disclosure, the network state management model is designed based on a key-value pair, describes the node, the link, and their connection relationships in detail, and is implemented on a Redis database. This embodiment of the present disclosure uses a synchronization mechanism to ensure state consistency between the model and the underlying emulation network. Finally, this embodiment of the present disclosure provides a plurality of dynamic APIs for the upper layer based on the network state management model, which is convenient for a researcher to perform dynamic-related operations in batches and a programmable manner.

TABLE 1

| | | |
|---|---|---|
| Node state management model | | |
| Model name | Key | Value |
| {Project name}_{node name} | image_name | Image used by the node |
| | container_id | Container ID |
| | type | Node type, such as host/router/switch/controller |
| | subtype | Specific node subtype, such as ubuntu/quagga/ovs/ryu |
| | config | Node configuration in a json form (configuration specific to each type of node) |
| | link_{Link name} | Specific network interface card information: {"ip": "IP address of the network interface card", "mask": "subnet mask", "nic": "name of the network interface card", "mac": "MAC address of the network interface card"}. This entry may have a plurality of items corresponding to a plurality of network interface cards of the node. |
| | gateway | Gateway of the node |

Table 1 shows the node state management model provided in this embodiment of the present disclosure, which records various types of information of the node (based on an actual situation, recordable information is not limited to the above information). The model uniquely locates one node in a project of a researcher (user of the network emulation system) based on a combination of a project name and a node name and records an actual container ID of the node, which is convenient for the rapid location of a node instance during the execution of the dynamic API. The model records the image, node type, and node subtype information of each node, such that the researcher can perform batch dynamic operations on the node through classification. The model describes a specific configuration, a gateway, and other attribute information of the node, which is convenient for the researcher to dynamically configure a node attribute. In addition, the model also describes the information of all network interface cards of the node, such that the researcher can obtain basic network address information such as an IP address, a subnet mask, and a MAC address of a virtual node.

TABLE 2

Link state management model

| Model name | Key | Value |
| --- | --- | --- |
| {Project name}_{link name} | source_node | Name of a source node |
| | target_node | Name of a destination node |
| | source_type | Type of the source node |
| | target_type | Type of the destination node type |
| | source_nic | Name of a source network interface card |
| | target_nic | Name of a destination network interface card |
| | source_ip | Source IP address |
| | target_ip | Destination IP address |
| | source_attribute | Link attribute information such as bandwidth, delay, and packet loss rate of the source network interface card |
| | target_attribute | Link attribute information such as bandwidth, delay, and packet loss rate of the destination network interface card |

Table 2 shows the link state management model provided in this embodiment of the present disclosure, which describes link-related information and node connection relationships (based on an actual situation, recordable information is not limited to the above information). The model proposes two concepts of "source" and "destination" to distinguish between different nodes at both ends of the same link. After the nodes at both ends are distinguished, the model describes a node name, a node type, a network interface card name, an IP address, and other information about source and destination network elements at both ends of the link to provide the researcher with node connection relationship information, which is convenient for emulating dynamic startup/stop of the link in the topology. The model also records the bandwidth, the delay, the packet loss rate, and other link attribute information of the source and destination network cards, such that the researcher can dynamically change the link attribute by using the API based on the above information.

Figure 2:
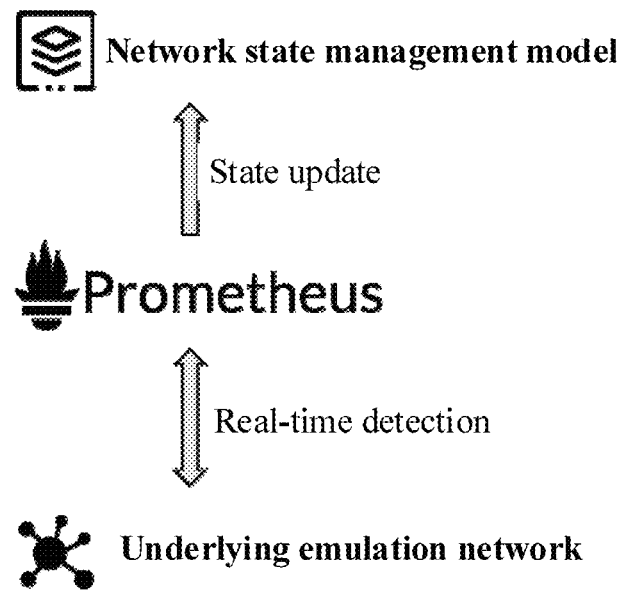
FIG. 2 is a schematic diagram of a method for synchronizing a network state management model of a network emulation system supporting a flexible and efficient dynamic experiment according to an embodiment of the present disclosure.

As shown in FIG. 2, in terms of synchronization of the network state management model, to ensure state consistency between the network state management model and an actual underlying emulation network, this embodiment of the present disclosure combines Prometheus (application program for state monitoring, namely, an open-source monitoring system) to collect the state of the underlying emulation network in real-time, including a node operation state, a real-time node attribute, a link operation state, a real-time link attribute, and the like. If the state of the underlying emulation network is inconsistent with that of the network state management model, the network state management model is updated in real-time.

During dynamic change and network state model synchronization, the network state management model needs to be read and written frequently. Therefore, this embodiment of the present disclosure implements the network state management model based on a Redis database. As a kind of memory database, the Redis database is characterized by quick reading and writing and can better support a key-value pair data structure. It should be noted that the implementation of the network state management model in the present disclosure may not be limited to the Redis database and may also be implemented based on another database.

TABLE 3

Dynamic API list

| API name | Function description |
| --- | --- |
| get_node_info | Obtaining node state information |
| get_link_info | Obtaining link state information |
| start_node | Starting the node |
| stop_node | Stopping the node |
| config_node | Configuring an attribute for the node |
| exec_node | Executing a Linux command on the node |
| create_link | Establishing a link between two nodes |
| stop_link | Stopping the link |
| config_link_address | Configuring address information for the link |
| config_link_attribute | Configuring the link attribute |

Table 3 shows a plurality of dynamic APIs provided to the user based on the network state management model in this embodiment of the present disclosure (other dynamic APIs may be developed and provided as required). These APIs conform to RESTful (a design style and development mode of network applications, which is based on HTTP and can be defined in an XML, format or a JSON format) and request a dynamic network emulation system through an HTTP protocol. Therefore, these APIs can be applied to various development languages used by the researcher. The researcher can control the dynamic performance of the underlying emulation network at any time in batches and a programmable manner through the dynamic API, including dynamic start/stop and dynamic configuration of the node and the link.

Figure 3:
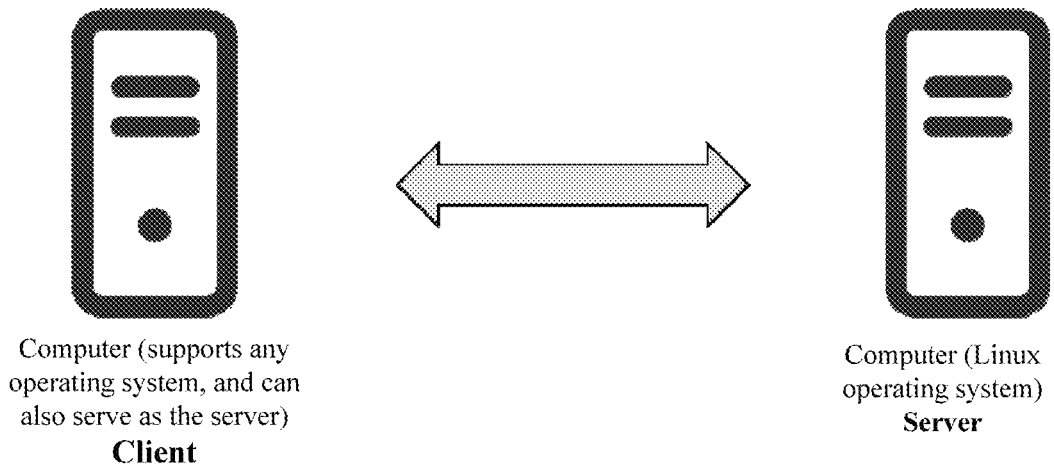
FIG. 3 is a schematic diagram of deploying a network emulation system supporting a flexible and efficient dynamic experiment according to an embodiment of the present disclosure.

In this embodiment of the present disclosure, a deployment environment is shown in FIG. 3. The deployment environment includes a client and a server. The client is a computer (any operating system, which may share the same computer with the server), and the server is a computer based on the Linux operating system. The network emulation system provided in this embodiment of the present disclosure is easy to deploy, which is in client/server mode. Development personnel installs the network emulation system supporting a flexible and efficient dynamic experiment in this embodiment of the present disclosure on any computer equipped with the Linux operating system, such that any computer equipped with any operating system can use the system to quickly research and verify network innovation (it is required that the client and the server can communicate with each other).

A process of conducting a dynamic network experiment based on the network emulation system supporting a flexible and efficient dynamic experiment in the embodiments of the present disclosure includes the following steps.
1. Preparation
   (1-1) Install a relevant software environment on a server computer, where the operating system is ubuntu 18.04, the Python version is 3.8.0, the Docker version is 20.10.7, or the Redis version is 4.0.9.
   (1-2) Start a server program of the dynamic network emulation system on the server computer and monitor a designated port (for user access).
2. Experimental Procedure
   (2-1) A researcher needs to compile a topology creation script in combination with the API provided in the embodiments of the present disclosure, after the topology creation script is successful and runs on a server, create an initial underlying emulation network on the server, and initialize the network state management model, in other words, initialize the network state management model while the topology creation script is running.
   (2-2) In step (2-1), the researcher can define a node type, a node attribute, a link attribute, and other information in the topology creation script and can predefine a series of dynamic events in combination with a sleep function of a programming language.
   (2-3) Develop a to-be-verified algorithm (network algorithm used to achieve a target function or target performance) (implemented through programming), obtain a to-be-verified algorithm program, and upload the to-be-verified algorithm program to a specified node, where the algorithm program may contain a dynamic event.
   (2-4) Compile a dynamic script based on the dynamic API to achieve dynamic control of the underlying emulation network.
   (2-5) Run the dynamic script and the to-be-verified algorithm program and verify and evaluate the performance of the to-be-verified algorithm program under dynamic environments, such as dynamic node start/stop, dynamic node attribute configuration, dynamic link start/stop, and dynamic link attribute configuration.
   (2-6) Further optimize the to-be-verified algorithm program based on an experimental result, and repeat steps (2-3) to (2-5) to finally complete network innovation.

The embodiments of the present disclosure provide a network emulation system supporting a flexible and efficient dynamic experiment. The network emulation system uses container technology to perform container-based modeling on a variety of network nodes (such as a host, a switch, and a router) and veth-pair and TC technologies of the Linux operating system to emulate a link and its attribute to provide a dynamic underlying guarantee. A container-based network node has an attribute and interactivity approximate to those of a real network node, so it can support dynamic start/stop and dynamic configuration of various types of nodes. In addition, a virtual network interface card used in a veth-pair can be started and stopped at any time to ensure a dynamic start/stop ability of the link. The TC technology acting on the virtual network interface card can change a queue rule at a data plane at any time, providing an ability to dynamically change the link attribute. In addition, a network state management model based on a key-value pair is set and implemented by using a Redis database, which overcomes the problem that it is difficult to access data due to process isolation. The network state management model describes specific information and connection relationships of the node and the link and maintains consistency between the management model and an actual network by monitoring a current topology state in real-time. In addition, the network state management model provides a concise and unified dynamic API for an upper layer, which is convenient for a researcher to realize dynamic performance in batches and a programmable manner.

Finally, it should be noted that the foregoing embodiments are only used to illustrate the technical solutions of the present disclosure and are not intended to limit the present disclosure. Although the present disclosure is described in detail with reference to the foregoing embodiments, those of ordinary skill in the art should understand that they can still modify the technical solutions described in the foregoing embodiments or make equivalent substitutions to some technical features therein. These modifications or substitutions do not depart from the spirit and scope of the technical solutions in the embodiments of the present disclosure.

The aforementioned description is only some implementations of the present disclosure. It should be noted that those of ordinary skill in the art can further make several variations and modifications without departing from the inventive concept of the present disclosure, and such variations and modifications all fall within the claimed scope of the present disclosure.

What is claimed is:

1. A network emulation system supporting a flexible and efficient dynamic experiment, comprising:
   a server computer;
   a non-transitory computer-readable storage medium storing instructions that when executed by the server computer, cause the server computer to create an underlying emulation network and initialize a network state management model, wherein
   the underlying emulation network is configured to: emulate a node and a link between nodes, emulate different types of nodes by using a container technology, and establish an emulation link between two emulation nodes by using a veth-pair technology; and emulate a link attribute by using a traffic control (TC) technology of a Linux operating system, and support a dynamic configuration of an emulation link attribute, wherein an emulation network interface card is capable of being started or stopped at any time and is separately created on the two emulation nodes, and the emulation link is established between two emulation network interface cards;

the network state management model is configured to describe the node, the link, and connection relationships between the node and the link, wherein the node, the link, and the connection relationships are emulated by the underlying emulation network, the network state management model is configured to periodically perform a state synchronization with the underlying emulation network, and the network state management model is configured to provide a user with a dynamic application programming interface (API);

the network state management model describes node state information and link state management information in a form of a key-value pair;

in the node state information, one node is uniquely located based on a combination of a project name and a node name, wherein the node state information comprises:

a container identifier (ID) of the node, wherein the container ID of the node is configured to locate the node when the dynamic API is executed;

an image, a node type, and a node subtype information of the node, wherein the image, the node type, and the node subtype information of the node are used by the user to perform batch dynamic operations on the node through a classification;

node attribute information, wherein the node attribute information is used by the user to dynamically configure a node attribute; and network interface card information of the node, wherein the network interface card information of the node is configured to provide the user with basic network address information; and the link state management information is configured to uniquely locate one link based on a combination of the project name and a link name and describe related information and a connection relationship of the link, wherein the described information comprises:

source and destination nodes of the link;

network interface card information of the source and destination nodes of the link, wherein the network interface card information of the source and destination nodes of the link is configured to provide the user with connection relationship information of the nodes; and link attribute information, wherein the link attribute information is used by the user to dynamically configure the link attribute based on the link attribute information by using the API.

2. The network emulation system according to claim 1, wherein a synchronization mechanism between the underlying emulation network and the network state management model is:

collecting, by using a configured application program for a state monitoring, a state of the underlying emulation network in real-time, comprising a node operation state, a real-time node attribute, a link operation state, and a real-time link attribute; and when state information of the underlying emulation network is detected to be inconsistent with state information of the network state management model, updating the state information of the network state management model in real-time.

3. The network emulation system according to claim 1, further comprising a plurality of preconfigured dynamic APIs, the plurality of preconfigured dynamic APIs are used by the user to perform a dynamic start/stop and a dynamic configuration on the node and the link, wherein the plurality of preconfigured dynamic APIs are described in a form of a dynamic API list, comprising an API name and a function description.

4. The network emulation system according to claim 1, wherein the node attribute information comprises configuration information and a gateway of the node.

5. The network emulation system according to claim 1, wherein the network interface card information of the node comprises a name, a type, a network interface card name, and an Internet Protocol (IP) address of the node.

6. The network emulation system according to claim 1, wherein the link attribute information comprises bandwidths, delays, and packet loss rates of network interface cards of the source and destination nodes.

7. The network emulation system according to claim 1, wherein the network state management model is implemented based on a database comprising a Redis database.

8. The network emulation system according to claim 2, further comprising a plurality of preconfigured dynamic APIs, the plurality of preconfigured dynamic APIs are used by the user to perform a dynamic start/stop and a dynamic configuration on the node and the link, wherein the plurality of preconfigured dynamic APIs are described in a form of a dynamic API list, comprising an API name and a function description.

9. The network emulation system according to claim 2, wherein the node attribute information comprises configuration information and a gateway of the node.

10. The network emulation system according to claim 2, wherein the network interface card information of the node comprises a name, a type, a network interface card name, and an Internet Protocol (IP) address of the node.

11. The network emulation system according to claim 2, wherein the link attribute information comprises bandwidths, delays, and packet loss rates of network interface cards of the source and destination nodes.

12. The network emulation system according to claim 2, wherein the network state management model is implemented based on a database comprising a Redis database.

* * * * *